UNITED STATES PATENT OFFICE.

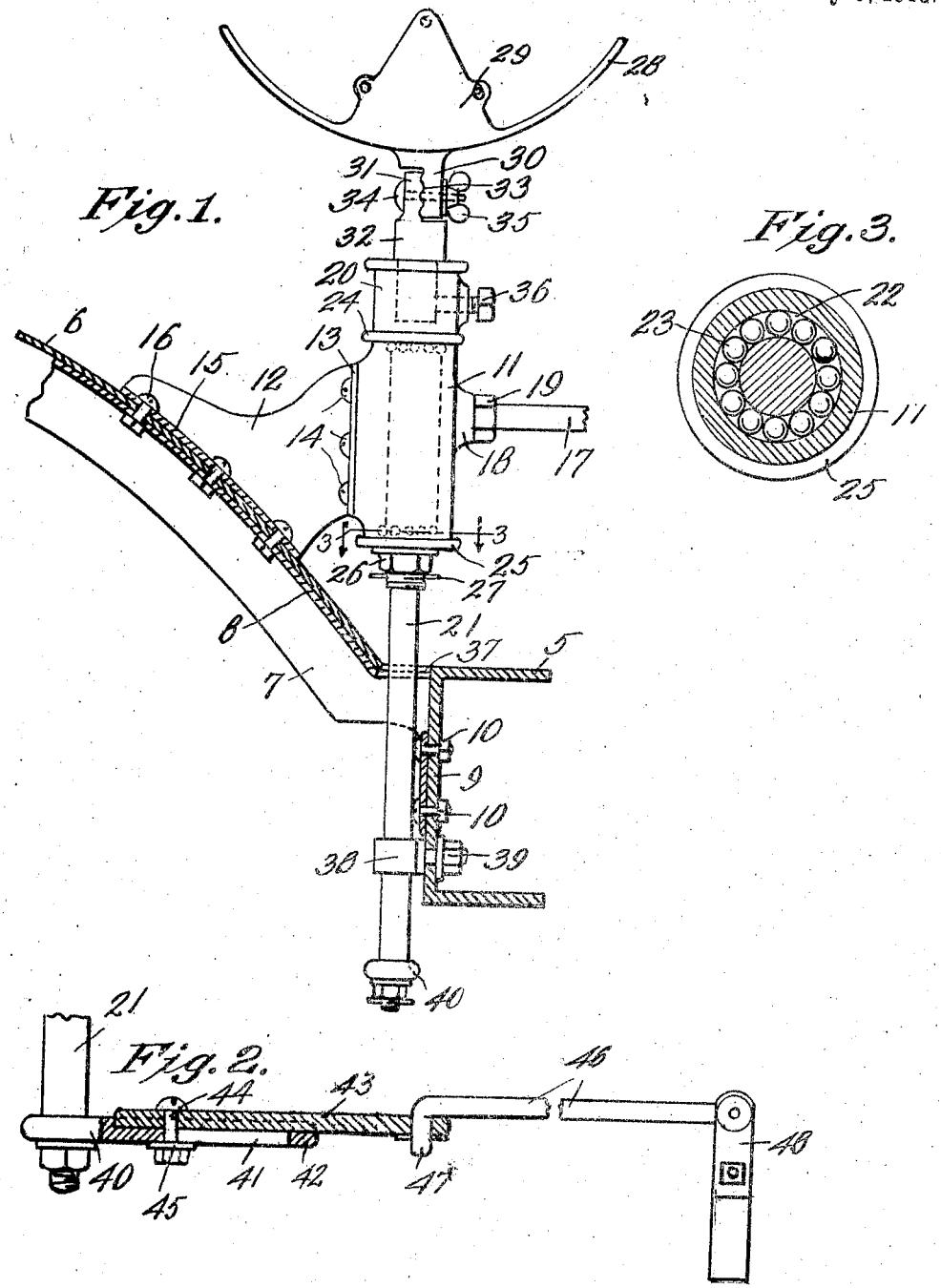

CHARLES O. BLAKE, OF ST. JOHNSBURY, VERMONT.

DIRIGIBLE HEADLIGHT.

1,303,017.

Specification of Letters Patent.

Patented May 6, 1919.

Application filed October 26, 1918. Serial No. 259,821.

*To all whom it may concern:*

Be it known that I, CHARLES O. BLAKE, a citizen of the United States, residing at St. Johnsbury, in the county of Caledonia and State of Vermont, have invented certain new and useful Improvements in Dirigible Headlights, of which the following is a specification.

This invention is a dirigible headlight and has for its principal object the production of a device which will automatically turn the lamps connected thereto, as the usual steering mechanism shifts the front wheels thus causing the rays of light projected by the lamps to be directly thrown in the path of movement of the vehicle upon which the structure is carried.

Another object of this invention is the production of a dirigible headlight which includes an efficient supporting means for holding the same in an operative position upon the mud guard of a vehicle.

One practical form of construction and assembly of the present invention will be hereinafter described and is illustrated in the drawing in which—

Figure 1 is an elevation of the device, the mud guard and beam of the vehicle frame being shown in section.

Fig. 2 is an elevation, partly in section of the connection between the shaft and the steering rod, and Fig. 3 is a section taken on the line 3—3 of Fig. 1.

In the preferred embodiment of the present invention about to be described, 5 indicates in general one of the side beams of the vehicle frame, from which the usual mud guard 6 extends. The reinforcing rib 7 is provided with a web 8 engaging the under surface of the mud guard 6, and illustrated in Fig. 1, thus reinforcing the mud guard at the point where the greatest strain is placed thereon. The rib 7 is provided with a flange portion 9 engaging the beam 5, this flange being retained by the securing elements 10, which of course may be of any desired nature.

A supporting sleeve 11 is hollow as indicated in Fig. 3. A plate bracket 12 has a vertical flange 13 upon one end, retained by the steering elements 14 upon the sleeve 11. The opposite end of the plate bracket 12 is provided with a diagonally extending curved flange 15 which bears firmly upon the curved mud guard 6 and the securing elements 16 pass through the flange 15 and the plate bracket 12 and also through the mud guard 6 and the web 8 of the rib 7. It will therefore be seen that the sleeve 11 is firmly retained in a vertical position. It should be understood that a device as herein illustrated is used upon each side of the vehicle or machine, although it is only deemed necessary to illustrate one device herein. It will be noted however that a connecting rod 17 is retained in engagement with the lug 18 on the sleeve 11 by a shaft nut 19.

A supporting collar 20 has a shaft 21 formed thereon, and this shaft 21 extends through the sleeve 11 to project for a considerable distance below the sleeve. The interior of the sleeve 11 is shouldered as indicated at 22, at each end thereof and constitutes therefor bearing ball spaces for receiving bearing balls 23 as shown in Figs. 1 and 3. The bearing washer 24 is interposed between the collar 20 and the sleeve 11, although the bearing balls at the upper end of the sleeve constitute a non-friction support for the collar 20. A bearing washer 25 also engages the lower end of the sleeve 11 and is retained in position by the nut 26, this nut being held against displacement by the cotter pin 27. It will thus be noted that the sleeve rotatably supports the shaft 21 and its collar 20.

A concaved bracket 28 has an abutment 29 thereon thus allowing a lamp to be fixed upon the bracket 28 and in engagement with the abutment 29 in any desired manner. A clamp section 30 is formed upon the plate 12 and engages a corresponding clamp section 31 mounted upon the stem 32 which is carried by the collar 20. It will be noted that the clamp sections 30 and 31 have serrated inner surfaces 33 retained in engagement with each other by the bolt 34 and a binding nut 35. Therefore, it is obvious that pitch of the plate 12 to bracket 28 may be adjusted. It will further be noted that a set screw 36 is carried by the collar 20 and engages the stem 32, as indicated in Fig. 1 for holding the bracket 28 in an adjusted position relative to the collar 20 to allow the angle of the rays of light to be directed inwardly or outwardly or straight ahead according to the adjustment of the stem 32.

The shaft 21 extends through suitable openings 37 formed through the mud guard and the web 8, as illustrated in Fig. 1 and extends to be carried by the general strap 38 retained by the clamping elements 39. This shaft 21 extends below the beam 5 and has the primary section of a slide arm connected thereto as indicated in Fig. 2. This primary section 40 has a slot 41 extending longitudinally thereof and is also provided with a groove 42 formed in its upper surface and extending longitudinally thereof. The auxiliary section 43 of the slide arm is movably mounted in the groove 42 and is retained in an adjusted engagement with the primary section 40 by the bolt 44 and its clamping element 45, this bolt 44 being carried by the auxiliary section 43 and extending through the slot 41. A link 46 has a bent end 47 engaging the auxiliary section 43 and the opposite end of this link 46 engages a frictional clamp 48 which is normally connected to the steering rod of a motor vehicle.

When the device is in operation the bracket 28 is first adjusted to regulate the pitch of the lamp carried thereon, while the stem 32 is also adjusted to cause the lamp to be so turned as to have the rays of light projected therefrom to be normally in a desired direction. The frictional clamp 48 is connected to the usual horizontal steering rod, not being deemed necessary to be herein illustrated and it is obvious that as the steering rod is shifted it will shift the link 46 and the slide arm, thus causing the shaft 21 to be curved. As hereinbefore suggested owing to the adjustable connection of the two sections and the slide arm the device may be used upon various machines of different sizes. As the shaft 21 is turned, it will obviously impart rotary motion to the collar 20 and this action of the collar will cause the stem 32 to move the clamp bracket 28. Thus it will be seen that the lamp will be automatically turned as the wheels of the motor vehicle are shifted.

It will also be noted that the construction of the plate bracket 12 allows the device to be carried upon the mud guards of ordinary construction, although the supporting sleeve 11 will positively retain the shaft 21 in a vertical position for properly carrying the lamp upon the lamp bracket 28.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having fully described my invention, what I claim as new and desire to secure by Letters Patent, is:—

1. In a device of the class described, the combination of a frame including a mud guard, a plate bracket having a vertical flange at one end and diagonal curved flange at the opposite end thereof, a rib having a web bearing upon said mud guard, said rib being fixed upon said frame, securing elements passed through the diagonal flange of said bracket and also through the mud guard and said web for fixing said bracket upon said web, a vertical sleeve carried by the remaining flange, lamp supporting means carried by said sleeve and means for adjusting said last mentioned means.

2. In a device of the class described, the combination of a frame including a mud guard, a plate bracket having a vertical flange at one end and a diagonal flange at the opposite end thereof, a rib having a web bearing upon said mud guard, said rib being fixed upon said frame, securing elements passing through the diagonal flange of said bracket and also through the mud guard and said web for fixing said bracket upon said web, a vertical sleeve carried by the remaining flange, lamp supporting means carried by said sleeve, and means for adjusting said lamp supporting means.

3. In a device of the class described, the combination of a frame including a mud guard, a plate bracket having flanges at its end, a rib having a web bearing upon said mud guard, said rib being fixed upon said frame, securing elements passing through one of said flanges of said bracket and also through the mud guard and said web for fixing said bracket upon said web, a vertical sleeve carried by the remaining flange, a lamp supporting means carried by said sleeve, and means for adjusting said lamp supporting means.

4. In a device of the class described, the combination of a frame including a mud guard, a plate bracket having flanges at its opposite ends, reinforcing means fixed upon said frame and bearing upon the under surface of said mud guard, securing means passing through one of the flanges of said bracket, and through said mud guard, and said reinforcing means for fixing said bracket upon said mud guard, a sleeve carried by the remaining flange, lamp supporting means carried by said sleeve, and means for adjusting said last mentioned means.

In testimony whereof I affix my signature in presence of two witnesses.

CHARLES O. BLAKE.

Witnesses:
WILBUR J. FARR,
R. N. HOWARD.